United States Patent [19]

Shindo

[11] Patent Number: 4,828,381
[45] Date of Patent: May 9, 1989

[54] AUTOMATIC VISIBILITY CORRECTION VIEWFINDER SYSTEM FOR OPTICAL DEVICES

[75] Inventor: Osamu Shindo, Tokyo, Japan

[73] Assignee: Asahi Kogaku Kogyo Kabushiki Kaisha, Tokyo, Japan

[21] Appl. No.: 159,088

[22] Filed: Feb. 23, 1988

[30] Foreign Application Priority Data

Feb. 24, 1987 [JP] Japan .................. 62-39064

[51] Int. Cl.$^4$ .................. A61B 3/10; A61B 3/14
[52] U.S. Cl. .................. 351/211; 351/206; 354/62
[58] Field of Search .................. 351/205, 206, 211; 354/62

[56] References Cited

U.S. PATENT DOCUMENTS

4,318,585  3/1982  Matsumura .................. 351/206 X

Primary Examiner—Rodney B. Bovernick
Attorney, Agent, or Firm—Sughrue, Mion, Zinn, Macpeak & Seas

[57] ABSTRACT

A viewfinder system for cameras and the like which automatically corrects its visibility to accommodate the particular version of the viewer. A lens in the viewfinder optical system, which is moveable to adjust visibility of the viewfinder, is automatically adjusted in response to the output of an eye refractometer that is constructed adjacent to and forms a part of the viewfinder optical system.

25 Claims, 3 Drawing Sheets

AUTOMATIC VISIBILITY CORRECTION VIEWFINDER SYSTEM FOR OPTICAL DEVICES

DETAILED DESCRIPTION OF THE INVENTION Field of the Invention

The present invention relates to a viewfinder system, and particularly relates to viewfinder systems used as an automatic visibility correction viewfinder for a camera, a TV camera, or the like.

BACKGROUND OF THE INVENTION

Conventionally, the visibility of the viewfinder for a camera or the like is fixed to be −1D. Accordingly, myopic persons and hyperopic persons must put a visibility correction lens on the viewfinder in order to accurately focus the camera. The disadvantage of this requirement is that it may be necessary to change the visibility correction lens when the photographer is changed. A further disadvantage is that the visibility correction lens may be lost when it is changed.

Cameras have been proposed which permit the visibility of a viewfinder affixed to the camera to be manually adjusted. When a very presbyopic photographer uses the camera, however, the photographer frequently encounters difficulty in correcting to the desired visibility because the photographer cannot look at the tips of his fingers.

In view of the foregoing problems, an object of the present invention is to provide a viewfinder system in which correction of visibility is automatically performed.

SUMMARY OF THE INVENTION

An viewfinder system having a viewfinder optical system, including a lens, an eye refractometer for detecting a value related to eye refractive power an eye of a person viewing into the viewfinder, and a visibility correction device for adjusting a position of the lens of the viewfinder optical system in accordance with the value related to the eye refraction force detected by the eye refractometer to thereby correct visibility of the viewfinder optical system.

DESCRIPTION OF THE PREFERRED EMBODIMENTS

Figure 1:
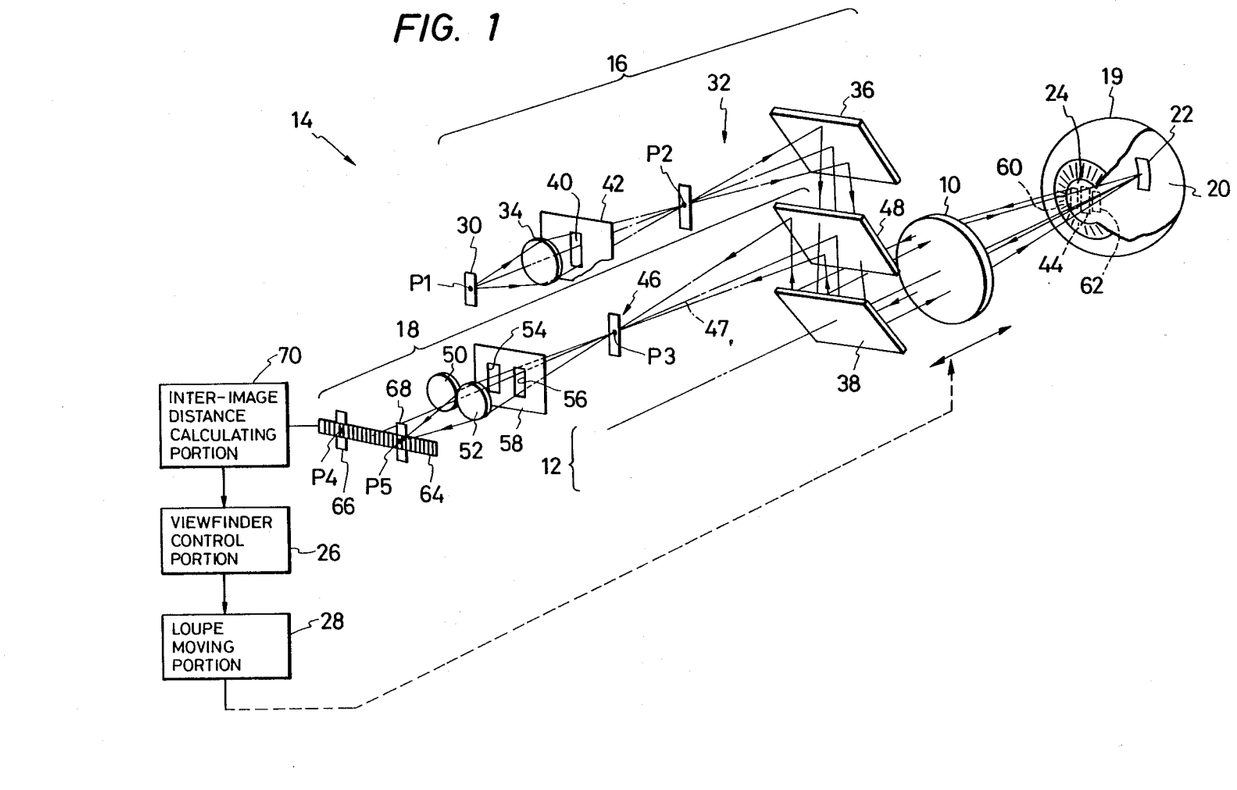
FIG. 1 is a diagram showing an embodiment of the viewfinder system according to the present invention.

FIG. 1 shows a first embodiment of the present invention, which relates to a viewfinder system having an automatic visibility correction function. The viewfinder system of FIG. 1 is arranged so that an image of an object formed on a film surface by a photographing lens is directly observed by using an original viewfinder optical system 12 that includes a viewfinder loupe 10. In the viewfinder system, an eye refractometer 14 is provided which uses an optical axis common to the original viewfinder optical system 12 at the rear portion side of the original viewfinder optical system 12. The viewfinder loupe 10 is arranged to be displaced along that axis, in the front/rear direction (as shown by the double arrow-line), in accordance with the detected output of the eye refractometer 14.

The eye refractometer 14 comprises a light-transmission device 16 and photo-detection device 18. The eye refractometer is arranged so that a predetermined light-source projection image 22 is formed on the retina 20 of an eye 19 of a person viewing into the viewfinder loupe 10 by the light-transmission apparatus 16. When the light-source projection image 22 is observed from two different points on the pupil 24 of the eye 19, a phase difference is detected by the photo-detection device 18 to thereby obtain data related to the quantity of defocusing. On the basis of the data, the quantity and direction of displacement of the viewfinder loupe 10 required for correction of visibility corresponding to eye refractive power are determined in a viewfinder control portion 26. In response to that determination, a loupe moving portion 28 is controlled so as to displace the viewfinder loupe 10 in the front/rear direction.

A so-called phase difference detecting method, used for obtaining data related to the quantity of defocusing in the case, employs triangulation principles well-known in a single-lens reflex auto-focus systems. In such systems, the quantity of defocusing is obtained from parallax when an "object" is observed through two different points on "a pupil" of "a lens". In this embodiment, the "lens" corresponds to the crystalline lens of the eye and the viewfinder loupe 10, and an "object" corresponds to the light-source projection image 22 projected on the retina 20.

In the light-transmission device 16, light emitted from a light source 30 is focused generally onto a position of the retina 20. The optical axis of the light is joined with that of the original viewfinder optical system 12 in front of the viewfinder loupe 10 by a light-transmission optical system 32. As seen in FIG. 1, the light source 30 is disposed at a point P1 substantially conjugate with the retina 20 at one end of the light-transmission optical system 32. The light emitted to the right in FIG. 1 from the light source 30 is focused once by a lens 34 at a point P2 substantially conjugate with the retina 20 in the light-transmission optical system 32. In that case, the optical axis of the light-transmission optical system 32 is bent by two reflection members 36 and 38, each of which is respectively disposed on an optical axis of the lens 34, and an optical axis of the original viewfinder optical system 12 at an angle of 45°. The reflection members 36 and 38, may comprise a prism member and a dichroic mirror, respectively. Their reflective surfaces are angled in opposition to each other so that the optical axis of the light-transmission optical system 32 coincides with that of the viewfinder loupe 10. The light is then passed through the viewfinder loupe 10 and the crystalline lens of the eye 19, and an image of the light source is projected on the retina 20 so that the"

light-source image is to be focused in the vicinity of the retina 20.

A mask 42, having a first rectangular opening or aperture 40 that passes the optical axis of the lens 34, is disposed at a point substantially conjugate with the pupil 24 between the lens 34 and the point P2. The mask 42 blocks a portion of the luminous flux coming out of the lens 34. The flux transmitted through the lens 34 is shaped into a rectangle. When projected into the viewfinder optical system 12, a first rectangular passage region 44 is formed on a part of a region of the pupil 24 and is centered on that region, as seen in FIG. 1.

The projection image 22 of the light source is formed on the retina 20 with sufficient brightness by the light-transmission device 16 so that the phase difference can be detected by the photo-detection device 18. However, in the case of using only natural light, the quantity of reflection light from the eyeground retina is exceedingly small so that no image on the retina can be detected.

It also should be noted that, generally, the retina 20 and the light source 30 are not perfectly conjugated with each other because the eye refractive power may take various values.

The light of the light-source projection image 22 projected on the retina 20 is reflected and passes back through the pupil 24 and the viewfinder loupe 10, and is then reflected by the reflection member 38 into the direction of the reflection member 36 so as to be taken into a light-reception optical system 46. Specifically, a half-mirror 48 is disposed between the reflection members 38 and 36 in parallel with members 38 and 36, so that the reflection light from the reflection member 38 is further reflected by the half-mirror 48. Accordingly, the reflected light is advanced in the same direction as the optical axis of the light-transmission optical system 32. Then, after being focused once on a focal point in the vicinity of a point P3 substantially conjugate with the retina 20, the reflected light is focused again to form two similar images in the vicinity of two points P4 and P5 substantially conjugate with the retina 20 at the termination end of the light-reception optical system 46. The focusing is accomplished by a pair of re-focusing lenses 50 and 52 bilateral-symmetrically disposed on the both sides of an extension of a main optical axis 47 of the light-reception optical system 46. Thus, observing the image of the light-source projection image 22 focused in the vicinity of the point P3 from the different directions through the re-focusing lenses 50 and 52, two re-focused images 66 and 68 can be obtained on subsidiary optical axes obtained by dividing the main optical axis 47 in two directions. This means that the light-source projection image 22 on the eyeground is observed from two different points on the "pupil", which is a composite lens of the crystalline lens and the viewfinder loupe 10.

A mask 58 is disposed at a point substantially conjugate with the pupil 24 between the point P3 and the re-focusing lenses 50 and 52. The mask 58 has a second and a third opening 54 and 56 formed therein bilateral-symmetrically for limiting luminous flux that is incident onto the re-focusing lenses 50 and 52 respectively. Due to the presence of mask 58, the luminous flux originating from the pupil 24 and directed onto the light-reception optical system 46, is limited. Specifically, the flux incident onto the re-focusing lenses 50 and 52 is that which has been passed through only a third and a second passage region 62 and 60 located as part of the pupil 24 bilateral-symmetrically on the both sides of the first passage region 44. Optical axes of the re-focusing lenses 50 and 52 are passed through the centers of the second and third openings 54 and 56 respectively. The second and third openings 54 and 56 correspond to the third and second passage regions 62 and 60 respectively, so that the images re-focused in the vicinity of points P4 and P5 are formed by luminous flux passed through only the third passage region 62 and only the second passage region 60, respectively. The vignetting by the pupil 24 of the luminous flux incident into the re-focusing lenses 50 and 52 is prevented by the second and third openings 54 and 56.

Further, the openings of the masks 42 and 58 are formed so as not to make the first, second, and third passage regions 44, 60, and 62 overlap with each other. Therefore, no disturbance is generated in the re-focused images formed by the re-focusing lenses 50 and 52 in the light-reception optical system 46, even if the light emitted from the light source 30 is partly reflected by a plane having a rapidly changeable refractive index in the vicinity of the pupil 24. Such plane may be for example, a crystalline-lens surface or a cornea surface, when the light is passed through the first passage region 44.

As a result of the above structure, the light-source projection image 22 projected on the retina 20 through the central portion of the pupil 24 is simultaneously observed in two different directions through two peripheral points on the pupil 24, so that two re-focused images can be obtained. It can be appreciated that the structure of the light-transmission optical system 32 and the light-reception optical system 46 is quite simple. However, by contrast, the conventional system clearly is more complex because that arrangement must permit luminous flux to be transmitted alternately from two positions at the periphery of the pupil and the luminous flux to be received out of the center of the pupil, with the positions of openings being controlled.

A linear image sensor 64 is disposed at the termination end of the light-reception optical system 46 so as to extend in the direction perpendicular to the extension of the main optical axis 47 of the light-reception optical system 46 and to pass through the openings 54 and 56 conjugated with the pupil 24 so as to detect the re-focused images 66 and 68 formed at the points P4 and P5 by the re-focusing lenses 50 and 52. The output of the linear image sensor 64 is connected to an inter-image distance calculating portion 70, in which the respective central positions of the re-focused images 66 and 68 on the coordinate fixed relative to the one-dimensional image sensor 64 are obtained to thereby determine the distance y therebetween.

In this case, if the eye refractive power of the eye 19 changes, not only is the light-source image focused in the eye 19 displaced correspondingly, but the light-source projection image 22 viewed from the light-reception optical system 46 is displaced equivalently, so that the focal position in the vicinity of the point P3 is displaced frontward/rearward on the optical axis. Therefore, the re-focused images 66 and 68 focused on the one-dimensional image sensor 64 are displaced in the direction of the line of the linear image sensor 64. Now, assuming that a center distance between the re-focused images 66 and 68 (in a condition that the retina 20 is perfectly conjugate with the linear image sensor 64) is prepresented by $y_o$, it is possible to paraxial-calculate a certain eye refraction force D from a difference value $\Delta y$ obtained by subtracting $y_o$ from the center distance y detected under the certain eye refraction force D, on the basis of the following expression (1):

$$D = -1000 \cdot \Delta y / |m| \cdot f \cdot h \quad (1)$$

In the equation, m represents a magnification of the optical system between the point P3 of the light-reception optical system 46 and the points P4 and P5, f represents a composite focal length of the optical system between the eye 19 and the point P3 of the light-reception optical system 46, and H represents a center distance between the second and third passage refions 60 and 62. In this case, distortion of the optical system is assumed to be sufficiently small. Therefore, the eye refractive power D can be obtained by a previously prepared conversion table in accordance with expression (1) with respect to the value y produced from the inter-image distance calculating portion 70, or through calculation by using a predetermined calculating portion.

In this embodiment, the output of the inter-image distance calculating portion 70 is connected to the viewfinder control portion 26 which is made to perform a predetermined conversion on the basis of the value y to thereby determine and output the quantity of operation necessary for correction of visibility corresponding to the eye refractive power D, that is, the direction and quantity of displacement of the viewfinder loupe 10. The output of the viewfinder control portion 26 is connected to the loupe moving portion 28 which is made to move the viewfinder loupe 10 to a position suitable for the eye reflection force D under the control of the viewfinder control portion 26. As a result, an image of a subject is focused on the retina 20 by the original viewfinder optical system 12. After completion of the correction of visibility, the value Δy is zero.

In this embodiment, automatic correction of visibility is performed so as to make it possible to bring a camera into a focused state only by a user of the camera viewing into the view finder independently of the user's individual difference, for example, myopia, heperopia, or emmetropia. Automatic correction is possible because data related to the eye refractive power D are detected by the eye refractometer 14 combined with the original viewfinder optical system 12, so that the loupe moving portion 28 is driven under control of the viewfinder control portion 26 on the basis of the detected data to thereby move the viewfinder loupe 10 to a position suitable for the eye refractive power D. Further, it is not necessary to perform positional change-over of luminous flux passed through the pupil 24, so that the eye refractometer 14 can be made simple in structure and decreased in size, because the light emitted from the light source 30 is projected by the light-transmission optical system 32 onto the retina 20 through the central portion of the pupil 24 while being restricted by the mask 42. When the reflection of the light-source projection image 22 is taken into the light-reception optical system 46, the light-source projection image 22 is re-focused at two positions on the one-dimensional image sensor 64 by dividing the light-reception optical axis into two optical axes by the re-focusing lenses 50 and 52 and the mask 58 so that the re-focused images are made equivalent to this images obtained by viewing the light-source projected image 22 from two peripheral positions on the pupil 24. Also, no disturbance due to the reflection light is generated on a cornea surface or a crystalline-lens surface so that the positions of the re-focused images 66 and 68 can be surely detected, because the first passage region 44 of the pupil 24 through which the light emitted from the light source 30 passes is not overlapped with the third and second passage regions 62 and 60 of the pupil 24 through which is passed the luminous flux to be used for re-focusing by the re-focusing lenses 50 and 52. Moreover, the re-focused images 66 and 68 are not affected by vignetting due to the pupil 24, because the second and third passage regions 60 and 62 are included in the pupil 24.

Further, it is not necessary to provide any movable controlled member in the eye refractometer 14, so that the system can be made simple in structure and decreased in size. The positional data concerning the whole images of the re-focused images 66 and 68 are detected by the one-dimensional image sensor 64, and the inter-image distance related to the eye refractive power is obtained by the inter-image distance calculating portion 70.

Figure 2:
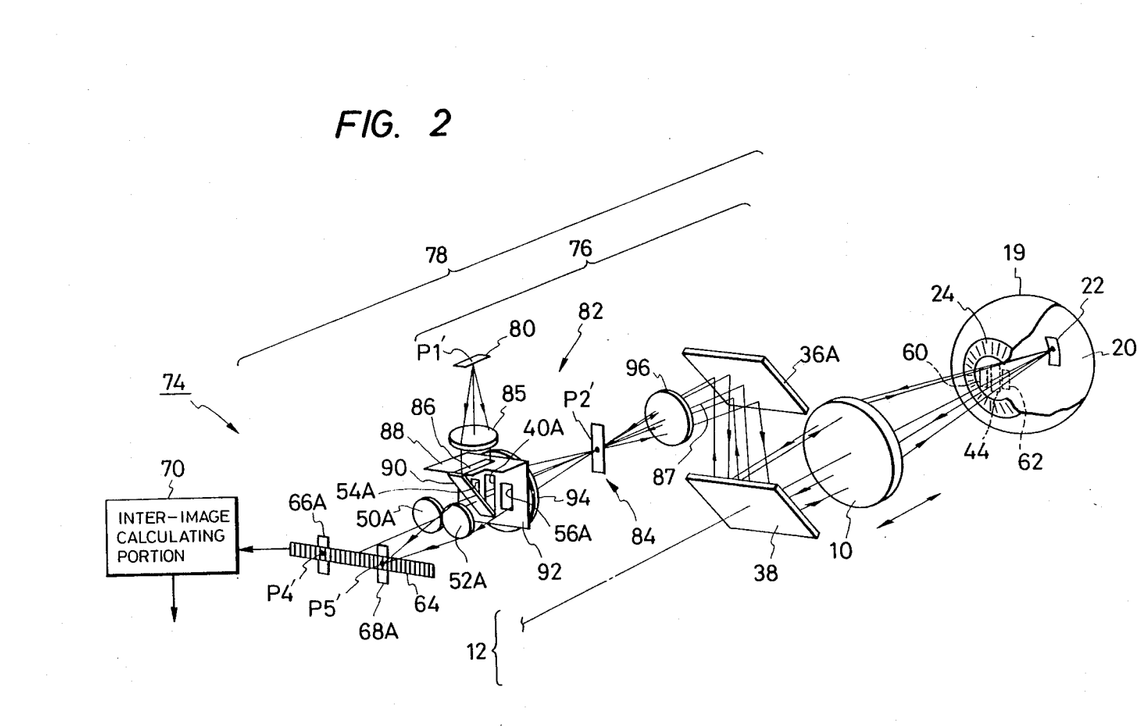
FIG. 2 is a diagram showing another embodiment of the viewfinder system according to the present invention.

Next, referring to FIG. 2, a second embodiment of the present invention will be described. Constituent parts the same or equivalent to those in FIG. 1 are referenced correspondingly, and explanation thereof is omitted.

An eye refractometer 74 includes a light-transmission device 76 and a light-reception device 78. The respective optical axes of the light-transmission device 76 and the light-reception device 78 are made common along most of their length. The light-transmission device 76 will be described first. Owing to a light-transmission optical system 82, the light emitted down in FIG. 2 from a light source 80 is made to have an optical axis in common with a light-reception optical system 84 at the light-reception device 78 side, and have a further optical axis in common with an original viewfinder optical system 12. That is, the light source 80 is disposed on a point P1' substantially conjugate with a retina 20 at the initiation end of the light-transmission optical system 82, and the light emitted from this light source 80 is advanced down while being converged by a lens 85 provided under the light source 80.

A reflection member 90 is disposed under the light source 80 and slanted at an angle 45° relative to the optical axis of the light-reception optical system 84 through a mask 88 having a rectangular opening 86 that includes at its center the optical axis of the light-transmission optical system 82, so that light passed through the opening 86 is reflected by the reflection member 90 in the optical axis of the original viewfinder optical system 12.

A mask 92 having a first opening 40A, including at its center the optical axis of the light-transmission optical system 82, is disposed at a point substantially conjugate with a pupil 24 at the down stream side of the reflection member 90. Being restricted through the opening 86 and the first opening 40A, the luminous flux coming out of the lens 85 is allowed to pass only through a first region 44 of the pupil 24. The opening 86 is formed to have the same size as that of the first opening 40A, and is made to be at a right angle with the first opening 40A. The reflection member 90 is formed to be slightly larger than those openings (however, luminous flux is hardly prevented from passing through a second and a third opening 54A and 56A described later), so that unnecessary light from the light source is not incident into the light-reception optical system 84. The unnecessary reflection may be considerably prevented also by coating the optical system or by use of a polarization technique.

An auxiliary lens 94 is disposed immediately downstream the mask 92, so that the light from the light source passed through the auxiliary lens 94 is focused on a point P2′ substantially conjugate with the retina 20 in the light transmission optical system 82. The light from the light source advances through the next reducing lens 96 and is reflected down in FIG. 2 by a reflection member 36A disposed on the optical axis (in common with the light-reception optical system 84) of the light-transmission optical system 82 at an angle of 45° with respect to the optical axis. Further, the light from the light source is reflected by a reflection member 38 in the direction of the optical axis of the original viewfinder optical system 12, so that a light-source projection image 22 is projected on the retina 20 through a viewfinder loupe 10 and the crystalline lens of an eye 19.

Next, the light-reception device 78 will be described. Reflection light of the light-source projection image 22 passed through the pupil 24 and the viewfinder loupe 10 is reflected by the reflection member 38, and taken into the light-reception optical system 84. Specifically, the light reflected by the reflection member 38 is further reflected by the reflection member 36A into the direction parallel with the optical axis of the original viewfinder optical system 12, and the intensity of illumination of the light is increased by the reduction lens 96. Then, the light-source projection image 22 is focused at a focal point in the vicinity of the point P2′, and the light is incident into the auxiliary lens 94. The light coming out of the auxiliary lens 94 is advanced substantially in parallel with a main optical axis 87 of the light-reception optical system 84 because a focal point of the auxiliary lens 94 at the point P2′ side is located at the same position as the point P2′. The mask 92 is provided with second and third rectangular openings 54A and 56A formed on the both sides of the first opening 40A. The luminous flux coming out of the auxiliary lens 94 is advanced toward the termination end of the light-reception optical system 84 while being limited by the second and third openings 54A and 56A. A pair of re-focusing lenses 50A and 52A are disposed following the auxiliary lens 94 so as to be bilateral-symmetrical with each other on the two sides of an extension of the main optical axis 87 of the light-reception optical system 84. The respective optical axes of those re-focusing lenses 50A and 52A are made to be parallel with the extension of the main optical axis 87 and are bent by the auxiliary lens 94 so as to intersect with each other at the point P2′. Therefore, the re-focusing lenses 50A and 52A view the point P2′ from two different directions in combination with the auxiliary lens 94 to thereby form two similar re-focused images 66A and 68A in the vicinity of two points P4′ and P5′ substantially conjugate with the retina 20 respectively on subsidiary optical axes obtained by dividing the main optical axis 87 into two parts.

The optical axes of the re-focusing lenses 50A and 52A pass through the respective centers of the second and third openings 54A and 56A. The luminous flux reflected from the light-source projection image 22 and passed through only a third and a second passage region 62 and 60 of the pupil 24 is incident into the light-reception optical system 84 so as to be passed through the re-focusing lenses 50A and 52A respectively.

The respective re-focused images 66A and 68A formed in the vicinity of the points P4′ and P5′ are detected by the one-dimensional image sensor 64, and the inter-image distance between the images 66A and 68A is obtained by an inter-image distance calculating portion 70. Then, the inter-image distance is converted into a control value that is used in a viewfinder control portion in the same manner as above as the case of FIG. 1. The viewfinder control portion controls a loupe moving portion so as to cause the latter to move the viewfinder loupe 10 to thereby carry out visibility correction.

The light source 80 is constituted by a near-infrared light emission diode including a long wavelength portion of a visible band as a luminous region. The source is made to be a fixed viewpoint for a person looking into peeping a viewfinder. Therefore, a user's line of vision is lead so as to locate the center of the pupil 24 on the optical axis of the original viewfinder optical system 12. Consequently, the second and third passage regions 60 and 62 come within the periphery of the pupil 24 so that there is a little possibility of occurrence of vignetting in luminous flux passed through the second and third passage regions 60 and 62. Accordingly, it is possible to reduce an error in inter-image detection by the inter-image distance calculating portion 70 due to deformation of image intensity distribution on the one-dimensional image sensor 64 or reduction in mean level of the image intensity.

Owing to provision of the auxiliary lens 94 immediately before the mask 92, reflection light from the light-source projection image 22 is made substantially perpendicular to the auxiliary lens 94 when it passes through the second and third openings 54A and 56A. This means that both the symmetry of the distribution of quantity of light on the one-dimensional image sensor 64 about the point P4′ corresponding to the point P2′ and the symmetry of the distribution of quantity of light on the one-dimensional image sensor 64 about the point P5′ are improved. Morever, deterioration in the foregoing symmetry is small, even in the case where the auxiliary lens 94 is made thicker.

The light-transmission optical system 82 has its optical axis in common with the light-reception optical system 84 at most points along the axis. Thus, the eye refractometer 74 can be decreased in size as well as in the number of parts thereof and therefore can be reduced in cost. Further, the respective axes of the optical systems 82 and 84 are made common with each other at a position before the first point substantially conjugate with the pupil 24 when viewed from the initiation end of the light-transmission optical system 82. Accordingly, the mask having the first opening 40A and the mask having the second and third openings 54A and 56A can be integrally formed into a single one to be disposed at one point. As a result, difficulty in adjustment of the optical system can be avoided in comparison with the case where the masks are disposed separately from each other, as shown in FIG. 1.

Since the mask 88, having the opening 86 of the same size as that of the first opening 40A, is provided between the lens 85 and the mask 92 separately at a predetermined distance from the mask 92, luminous flux of the transmission light between a point conjugate with the mask 88 in the eye 19 and the pupil 24 is prevented from being spread beyond the first passage region 44. Thus, reflection light of the luminous flux of the transmission light on the crystalline-lens surface or the like is prevented from entering the one-dimensional image sensor 64 through the second and third openings 54A and 56A of the mask 92 at the light-reception optical system 84 side. If the mask 88 was omitted, there is a possibility that the reflection light at a reflection plane at a position separated from a point substantially conjugate with the mask 92 might pass through the second and third openings 54A and 56A of the mask 92. Also, the reflection light at a reflection plane at a point substantially conjugate with the mask 92 might be cut, because the luminous flux of the transmission light would be converged to a minimum only at a point substantially conjugate with the mask 92 and spread at other positions, while reflection planes such as the retina, the crystalline lens and the like are distributed on the optical axis at intervals in the eye 19.

Further, owing to the provision of the reduction lens 96, the intensity of illumination of the light-source projection image 22 formed on the eyeground on the basis of the light source 80 increases. Also the intensity of illumination of the re-focused images 66A and 68A formed on the linear image sensor 64 on the basis of the light source projection image 22 increases. As a result, the efficiency of energy use in the optical system is improved and it is possible to use a light source which can be driven only by a battery as the light source 80 even when the optical system is arranged corresponding to the minimum pupil diameter of 2 mm in natural-sightedness. Use of a battery would permit the eye refractometer 74 to be portable.

The light from the light source to be passed through the pupil 24 is ranged within the first passage region 44.

The reduction lens 96 utilizes fact that when luminous flux is passed through a lens, generally, the more reduction factor increases, the more the intensity of illumination of the light increases with the diameter of the lens kept constant. Accordingly, the image detection can be easily performed by the light-reception device 78 even when the reflection light from the eyeground is weak. Further, the eye refractometer 14 can be decreased in sized by provision of the reduction lens 96. For example, a focal length of the eye 19 is generally about 17 mm calculated in terms of a value in air. Therefore the length form the viewfinder loupe 10 to the one-dimensional image sensor 64 can be made to be 17 mm or less by provision of the reduction lens 96.

Since one surface of the reducing lens 96 is made aspheric, distortion of the re-focused images 66A and 68A formed on the linear image sensor 64 is reduced, and the distribution of the quantity of light in the images is made uniform. For example, the following case may be considered as a specific example of the arrangement of the members following the reflection member 36A in the light-reception optical system 84.

Reflection member 36A (prism member):
Radius of curvature of reflection surface, radius of curvature at the exit/incident surface side . . . ∞
Thickness of center . . . 8 mm
Refractive index . . . 1.5126
Between reflection member 36A and reducing lens 96:
Attached to each other.
Reducing lens 96:
Radius of curvature at the incident side . . . ∞
Radius of curvature at the exit side . . . −8.500 mm
Thickness at center . . . 1.5 mm
Refractive index . . . 1.48716
Between reducing lens 96 and point P2′:
Distance . . . 12.74 mm
Refractive index . . . 1.000
Between point P2′ and auxiliary lens 94:
Distance . . . 17.31 mm
Refractive index . . . 1.000

Auxiliary lens 94:
Radius of curvature at the incident side . . . 8.430 mm
Radius of curvature at the exit side . . . ∞
Thickness at center . . . 1.20 mm
Refractive index . . . 1.48716
Between auxiliary lens 94 and mask 92:
Distance . . . 0 mm
Refractive index . . . 1.000
Mask 92:
Radius of curvature at the incident/exit side . . . ∞
Thickness at center . . . 0.04 mm
Refractive index . . . 1.000
Between mask 92 and re-focusing lens 50A and 52A:
Distance . . . 0 mm
Refractive index . . . 1.000
Re-focusing lens 50A and 52A:
Radius of curvature at the incident side . . . ∞
Radius of curvature at the exit . . . −4.157 mm
Thickness at center . . . 3.45 mm
Refractive index . . . 1.48716

Figure 3:
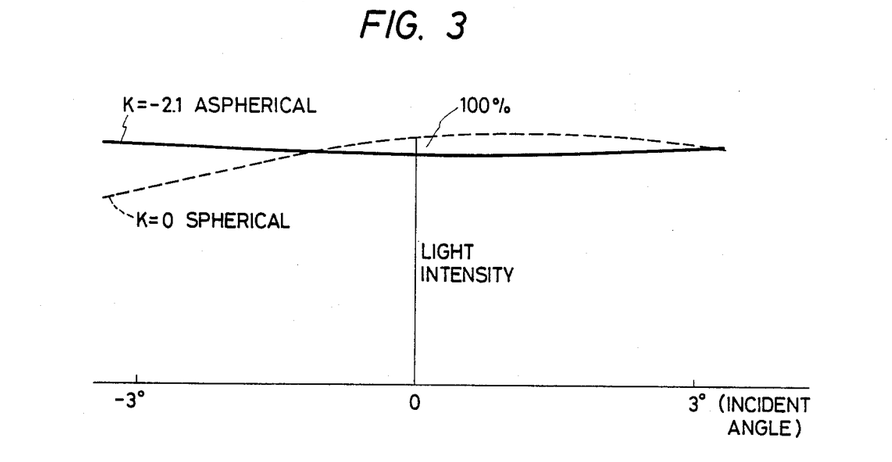
FIG. 3 is a diagram showing the relationship between the light incident angle of the photo-detection optical system and the intensity of light on the one-dimensional image sensor in FIG. 2 in the case where a reduction lens having an aspheric surface is used and in the case where a reduction lens having a spherical surface is used.
Figure 4:
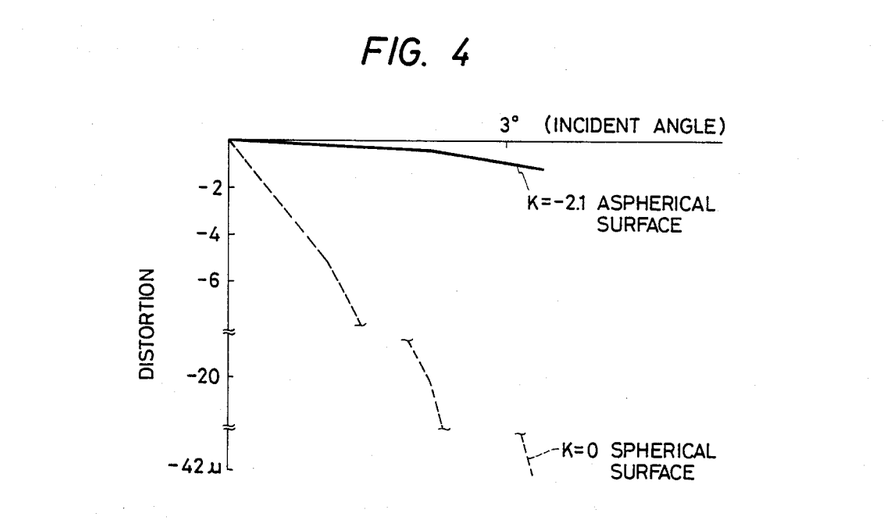
FIG. 4 is a diagram showing the relationship between the light incident angle of the photo-detection optical system and the distortion on the one-dimensional image sensor in FIG. 2 in the case where a reduction lens having an aspheric surface is used and in the case where a reduction lens having a spherical surface is used.

FIG. 3 shows the relationship between the incident light angle relative to the optical axis and the intensity of light on the linear image sensor 64 in the case where the reduction lens 96 is made to be spheric (K=−2.1) and in the case where the reduction lens 96 is made to be spherical (K=0), when light having a reference wavelength of 700 nm is used under the foregoing conditions. It is found that in the case of using the aspheric lens, the distribution of the quantity of light in the re-focused images 66A and 68A is made more uniform. Under the same conditions, the relation as shown in FIG. 4 is obtained between the incident light angle relative to the optical axis and the distortion on the linear image sensor 64. It is found that in the case of using the spheric lens, distortion is remarkably improved. Thus, by making one surface of the reduction lens 96 aspheric, the accuracy in image detecting by the linear image sensor 64 is improved, and also data related to the eye refractive power D produced from the inter-image distance calculating portion are made correct. The K in the foregoing parenthesis is a value in the following aspheric shape expression.

$$X = ch^2/[1 + \sqrt{1-(K+1)\,c^2h^2}]$$

where c represents a reciprocal of the radius of curvature, and h represents a height from the optical axis.

Although description has been made as to the viewfinder system in which the viewfinder loupe 10 is displaced on the basis of data related to the eye refractive power D obtained by the eye refractometer 14/74 so as to automatically correct visibility of the original viewfinder optical system 12 in the foregoing embodiments, a small-sized and portable automatic optometer utilizing the eye refractometer 14/74 may be realized.

In the viewfinder system according to the present invention, a value related to eye refractive power of an eye of a person viewing into a viewfinder is detected by an eye refractometer, and the position of a lens of a viewfinder optical system is adjusted by a visibility correction device in accordance with the detected value related to the eye refractive power so as to perform correction of visibility of the viewfinder optical system. Therefore, there is such a superior effect that the correction of visibility of the viewfinder optical system can be automatically performed in accordance with the eye refractive power of a person viewing into a viewfinder, so that the photographer can accurately perform focusing of a camera without requiring manual adjustment of the viewfinder to account for his/her own visibility.

Instead of the aspheric reduction lens 96, it is possible to use an aspheric loupe 10.

This and other objects, consistent with the disclosure as understood by one of ordinary skill in the art, may be accomplished by the prescribed invention, as disclosed and as modified in a manner that would be understood by one of ordinary skill in the art.

I claim:

1. A viewfinder system having a viewfinder with a first optical system, including an adjustable lens, said viewfinder system comprising:
   an eye refractometer means having a second optical system for detecting the eye refractive power of an eye of a person viewing into the viewfinder and generating an output whose value is related to the magnitude of said refractive power; and
   a visibility correction means, responsive to said output, for adjusting a position of said adjustable lens of said first optical system in accordance with the value of said refractive power to thereby correct the visibility of said viewfinder for the vision of the viewer.

2. The viewfinder system of claim 1 wherein said eye refractometer means further comprises:
   a source of a reference image;
   an image sensor means for detecting images projected thereon;
   a light transmission means comprising a third optical system, optically coincident with at least a part of said first optical system, for receiving said reference image at a first end thereof and projecting it from a second end thereof onto the retina of a viewers eye; and
   a light reception means comprising a fourth optical system, optically coincident with at least a part of said first optical system for receiving the reflection of said reference image from the retina at a first end thereof and projecting it from a second end thereof onto said image sensor means.

3. The viewfinder system of claim 2 wherein said light reception means further comprises means responsive to the movement of said reference image on the retina of the viewers eye as a function of the refractive power of the eye to produce two images at said second end thereof which are projected onto said image sensor means with a displacement therebetween representative of the magnitude of said eye refractive power.

4. The viewfinder system of claim 2 wherein said light transmission means further comprises a first mask means disposed in said third optical system for shaping said reference image and said light reception means further comprises a second mask means disposed in said fourth optical system for shaping said reflected reference image.

5. The viewfinder system of claim 4 wherein said first mask means and said second mask means are integrally formed into a single mask structure.

6. The viewfinder system of claim 2 wherein said third optical system and said fourth optical system are optically coincident with each other in a first part, said first part further including that portion of the two systems that are optically coincident with said part of said first optical system.

7. The viewfinder system of claim 6 wherein said first part extends prior to a point substantially conjugate with pupil when viewed from said first end of said light transmission means.

8. The viewfinder system of claim 6 wherein said common optical part includes a reduction lens that is aspheric.

9. The viewfinder system of claim 1 wherein said visability correction means further comprises a calculation means, using a predetermined calculation, for generating a lens position correction signal in response to the output from said image sensor means.

10. The viewfinder system of claim 1 wherein said visability correction means further comprises a conversion table means for generating a lens position correction signal in response to the output from said image sensor means.

11. The viewfinder system of claim 1 wherein said system output is applied to an optometer.

12. The viewfinder system of claim 2 wherein said reference image, when projected from said second end of said light transmission means may be simultaneously observed in two different directions through two peripheral points on the viewers eye so that two refocused images can be obtained.

13. The viewfinder system of claim 12 wherein said two refocused images are passed by said light reception means onto said image sensor means.

14. A view finder system comprising:
   a first optical system having an adjustable lens; and
   an eye refractometer means having a second optical system for detecting the eye refractive power of an eye of a person viewing into the viewfinder and generating an output whose value is related to the magnitude of said refractive power, said second optical system having a partially common optical axis with said first optical system.

15. The view finder system of claim 14 further comprising:
   a visibility correction means, responsive to said output, for adjusting a position of said adjustable lens.

16. A view finder system having a viewfinder with an optical system, including an adjustable lens, said viewfinder system comprising:
   an eye refractometer means for detecting the eye refractive power of an eye of a person viewing into the viewfinder and generating an output whose value is related to the magnitude of said refractive power;
   said eye refractometer means including:
   a light transmission system having a first point substantially conjugate with a retina of the eye and located at a terminal end of an optical path of said light transmission system, a second point substantially conjugate with the retina and different from said first point and located on the midway of the optical path of said light transmission system, and a third point substantially conjugate with a pupil of the eye;
   a light reception system having another first point substantially conjugate with the retina and located at a terminal end of an optical path of said light reception system, another second point substantially conjugate with the retina and different from said other first point and located on the midway of the optical path of said light reception system, and another third point substantially conjugate with the pupil of the eye;
   a light source disposed at the terminal end of said light transmission system;

a linear positional detector means disposed in said light reception system;

a visibility correction means, responsive to said output, for adjusting a position of said adjustable lens of said optical system of said viewfinder;

reflection means for partially commonly arranging the optical axes of said eye refractometer means and said viewfinder;

a first mask disposed in conjugate relation with the pupil in said light transmission system and having an opening around the optical axis thereof;

a second mask disposed in conjugate relation with the pupil in said light reception system and having a pair of openings in symmetrical relation with each other with respect to the optical axis thereof;

wherein the respective openings of said light transmission system and said light reception system are arranged so as to allow luminous flux to pass therethrough without any overlapping; and said light reception system includes a pair of symmetrical optical subsystems disposed between said second mask and said light source.

17. The viewfinder of claim 16, wherein said light transmission system and said light reception system have a common optical system from the retina to said second mask.

18. The viewfinder of claim 17, wherein said common optical system has a common optical axis, and said common optical system includes said adjustable lens located on said common optical axis.

19. The viewfinder of claim 16, wherein a focal length from said adjustable lens to the terminal end of said light reception system is not greater than 17 mm.

20. The viewfinder of claim 16, wherein said eye refractometer means includes a reduction lens having at least one aspherical surface, said reduction lens being disposed after said reflection means.

21. The viewfinder of claim 16, wherein said light source comprises a near infrared light emitting diode having a light emitting region including of a visible wavelength region.

22. The viewfinder of claim 16, wherein said eye refractometer means includes an auxiliary lens disposed just before said second mask and having a first focal point at said second point or said other second point.

23. The viewfinder of claim 16, wherein said first mask has an opening that is equal in configuration to the opening of said second mask, said first mask being located near to said light source.

24. The viewfinder of claim 17, wherein said eye refractometer means includes a reduction lens having at least one aspherical surface, said reduction lens being disposed after said reflection means.

25. The viewfinder of claim 18, wherein said adjustable lens has at least one aspherical surface.

* * * * *

UNITED STATES PATENT AND TRADEMARK OFFICE
CERTIFICATE OF CORRECTION

PATENT NO. : 4,828,381

DATED : May 9, 1989

INVENTOR(S) : Osamu Shindo

It is certified that error appears in the above-identified patent and that said Letters Patent is hereby corrected as shown below:

In claim 9, line 2, correct "visability" to --visibility--

In claim 10, line 2, correct "visability" to --visibility--

Signed and Sealed this

Twenty-ninth Day of January, 1991

Attest:

HARRY F. MANBECK, JR.

*Attesting Officer*     *Commissioner of Patents and Trademarks*